United States Patent
Chen

(12) 
(10) Patent No.: US 6,512,760 B1
(45) Date of Patent: Jan. 28, 2003

(54) ALTERNATE WIDE AREA NETWORK ACCESS FACILITY FOR LOCALLY NETWORKED COMPUTING DEVICES

(75) Inventor: Abraham Y. Chen, Mountain View, CA (US)

(73) Assignee: Avinta Communications, Inc, Mountain View, CA (US)

( * ) Notice: Subject to any disclaimer, the term of this patent is extended or adjusted under 35 U.S.C. 154(b) by 0 days.

(21) Appl. No.: 09/371,714

(22) Filed: Aug. 9, 1999

(51) Int. Cl.[7] .................................................. H04L 12/28

(52) U.S. Cl. ....................................... 370/351; 370/400

(58) Field of Search ................................. 370/351–358, 370/445, 400–402, 463, 254; 709/223, 224, 225

(56) References Cited

U.S. PATENT DOCUMENTS 6,219,413 B1 * 4/2001 Burg ............................ 379/215

* cited by examiner

Primary Examiner—Wellington Chin
Assistant Examiner—Brenda Pham

(57) ABSTRACT

A Local Area Network (LAN) having two or more computing devices equipped with Wide Area Network (WAN) access capability is conventionally predefined with the computing device having the best WAN link performance as the Gateway. In SOHO (Small Office Home Office) or residential settings where computing devices are powered on only when needed, the predefined Gateway often may not be ready to provide service. An active Client with WAN access capability could be utilized to establish an alternate link, temporarily. With an alternate WAN link established, other Clients' communication needs can be served by sharing such link. Even the Gateway, if it is powered on afterwards, would utilize this link instead of establishing its own which could disturb the ongoing traffic.

5 Claims, 5 Drawing Sheets

ALTERNATE WIDE AREA NETWORK ACCESS FACILITY FOR LOCALLY NETWORKED COMPUTING DEVICES

TECHNICAL FIELD

This invention relates to on-premise data communication systems.

BACKGROUND OF THE INVENTION

In recent years, the fast proliferation of Personal Computers (PC) and associated peripherals in workplace have created a need for communication among Computing Devices (CD). Local Area Network (LAN) has been developed to meet such demand. To link among CDs located at distance, Gateway technology was deployed to funnel messages between LANs through long distance communication facilities, generically referred to as Wide Area Network (WAN).

To communicate with one another, each CD on a LAN uses an Network Interface Card (NIC) to access a common transmission medium. Each NIC has an unique factory preset identity for addressing one another in transmitting data packets.

To coordinate these activities among multiple CDs, conventions have been established in LAN environment to transmit messages that broadcast the address, identity and status, etc. of each computing device.

To access other LANS, a Gateway CD uses a Modem as the physical interface to the WAN. Depending on the type of WAN in use, this modem could range from conventional analog telephone line type (e.g. V.90 56K bps), xDSL (Digital Subscriber Loop), ISDN (Integrated Service Digital Network), Cable, fiber, Radio to Satellite, etc. Once a connection is made, a Client CD conducts its transactions with a remote CD through Gateway via LAN facility. Thus, a Gateway assumes two personalities. It is a node in a LAN, as well as a focal point for WAN traffic.

To establish a WAN connection, a Client would request such service from Gateway by sending message through LAN with Gateway's address as destination header. After the connection is made by the Gateway, a Client would conduct communication using data packets made of the remote CD's address plus an overhead header of the Gateway's address, so that the messages will funnel through the Gateway. The most common application of this kind is to simultaneously access Internet from multiple CDs. The process of sharing the same WAN link is handled by a special class of software known as Internet Sharing Software (ISS).

Originally, coaxial cable were used as the physical connection medium for LANs. With improved transmission technology, twisted pair cables can now be used. Even though both have been deployed widely in business, the requirement of installing such specific wiring is not inducive in residential settings.

The lately available Home Phoneline Networking (HPN—U.S. Pat. No. 5,696,790) technology capable of transmitting high speed digital signals over a single pair of traditional on-premise telephone wiring has made residential level LAN service feasible. In particular, there is a great potential for applying this technology to SOHO (Small Office Home Office) settings. By utilizing the existing on-premise telephone wiring as transmission medium, a LAN can be easily established among data terminals equipped with interface modules based on HPN technology. With SOHO CDs networked, their original individualized WAN access can be consolidated by designating one CD as the Gateway.

Because LAN technology was originally developed for corporations, its operation principles do not suit SOHO situations very well. For example, the Gateway of a LAN is a communication focal point in a business. Thus, it is expected to operate continuously. Much emphasis has been spent to well equip it for maintaining a full-time, un-interrupted service. In the SOHO environment, a CD may be designated as a Gateway but it is just for the sake of conforming to the LAN operation convention and terminology for WAN access. Most components on a SOHO Gateway may be the same as any other Client CDs.

With a LAN, certain facilities originally installed on individual Clients are no longer used. This is economical in terms of simultaneous WAN access and peripheral device sharing. However, in SOHO and residential settings, CDs are powered on only when they are needed. Thus, the Gateway may not be turned on when a Client needs to access the WAN. The extra step of turning on the Gateway for such occasions puts a negative impact on the benefits of setting up a LAN for resources sharing. This is especially irritating for Clients originally had the same WAN access capability as the Gateway. For example, most new PCs are factory equipped with V.90 (56K bps) modems for independent WAN access. It is hard to explain to an user that, after the installation of a LAN, a Client PC has, all of a sudden, lost its ability to access the WAN, unless another PC (the Gateway) is also turned on.

It is therefore the objectives of this invention to present a methodology of enhancing the operation characteristics of a Client in a LAN when the service from the designated Gateway is not available.

Another goal of this invention is to avoid disrupting an active WAN connection, when a computing device capable of providing Gateway service joins the network.

Yet another objective of this disclosure is to maximize the opportunity for the originally designated Gateway, which is equipped equal or better than the Clients, to resume its Gateway responsibility.

SUMMARY OF THE INVENTION

This document discloses a novel local communication system operation protocol that utilizes the LAN status information to enhance the "artificial intelligence" of networked computing devices. That is, the Clients normally rely on the Gateway for WAN access, if it is active. But, any Client with WAN access capability can activate its independent facility if the Gateway is not ready to provide the service. Furthermore, if a WAN connection has already been established, other Clients should be configured to utilize this Client as WAN access point. Even the Gateway would join the network as a Client. Lastly, whenever possible, the Gateway will take over the control of WAN access, so that the predefined best possible service configuration is available to all terminals.

More specifically,

A. If a LAN has a Gateway ready to provide WAN access service, all other computing devices should stay in their predefined Client mode.

B. If no Gateway is active to provide WAN access service, each Client having WAN access facility will configure itself to be ready to use its own WAN access capability.

C. While one of the Clients, in the absence of the Gateway, has established a WAN connection, the other Clients will configure themselves to utilize this connection, when needed.

D. If the Gateway is powered on after a Client has already established a WAN connection, it should temporarily confine itself to be a Client. That is, the Gateway will access WAN through the Client already connected to WAN, thus avoiding to disturb the ongoing traffic.

E. Whenever the active WAN link is disconnected, the predefined Gateway would take over the control of the LAN and resume the responsibility of WAN access service.

F. Upon power down, any temporary Gateway/Client designations of the current session will be cancelled, such that the predefined network configuration will be attempted upon the next power on.

One basic application for this methodology is to establish a coordinated LAN operation for accessing WAN in SOHO environment where the flexibilities of establishing a shared access configuration as well as operating each CD standing-alone are equally important.

One of the advantages of the present invention is that a predefined configuration is maintained as much as possible to maximize the system performance. On the other hand, the proposed alternate link satisfies the Client's temporary needs, although such link may have lower service grade than that provided by the predefined Gateway.

DESCRIPTION OF THE PREFERRED EMBODIMENT

Figure 1:
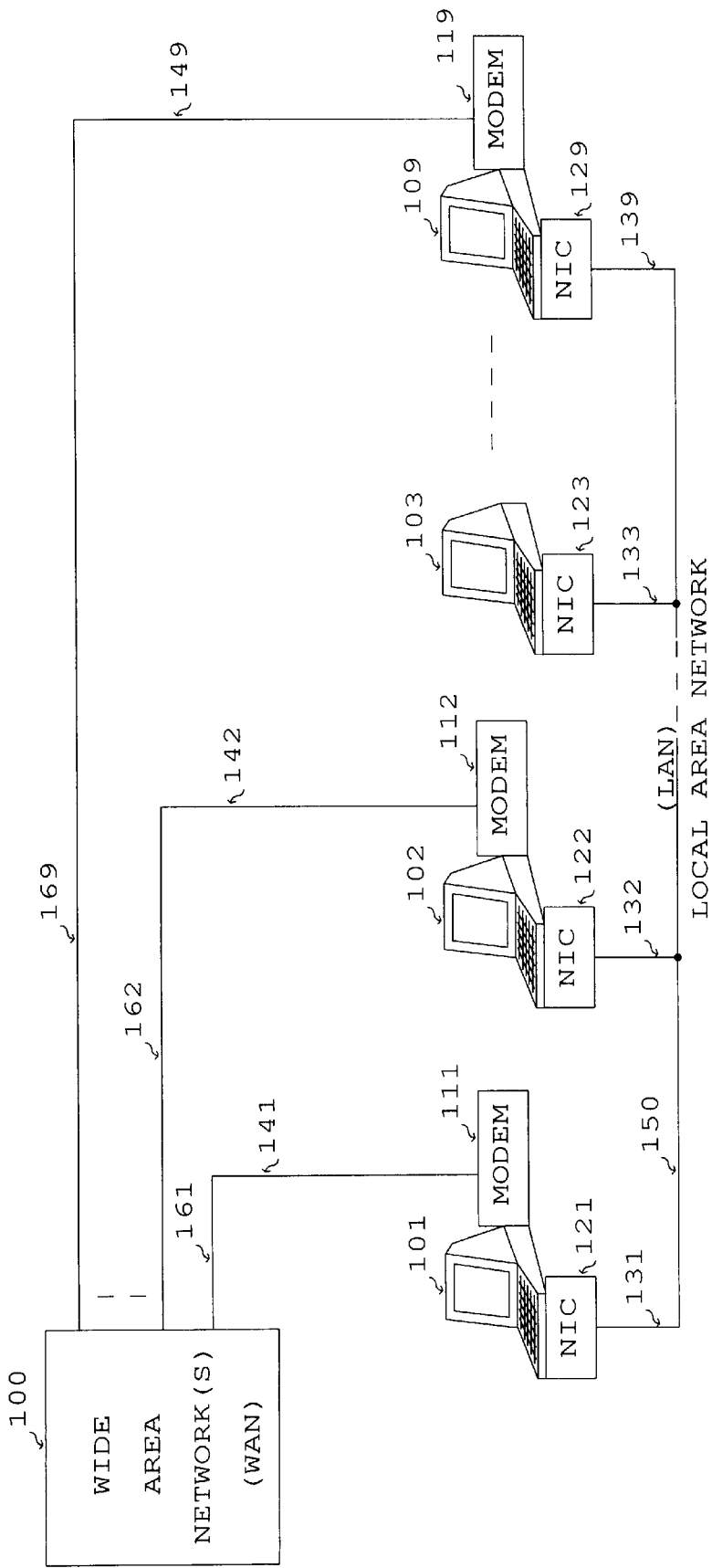
FIG. 1 is a block diagram showing the overall system of Computing Devices (CD) linked together through LAN and some are also capable of accessing WAN via additionally equipped modem.

FIG. 1 is an illustrative system configuration of my invention. Computing Device (CD) 101, 102, 103, . . . 109 are interfaced by Network Interface Card (NIC) 121, 122, 123, . . . 129 via Signal paths 131, 132, 133, . . . 139, respectively to a physical interconnection medium 150 to form a LAN. "Computer" symbols are used here to represent CDs which could be various data processing equipments, such as Personal Computer (PC), printer, scanner, digital camera, control and telemetry devices, etc. Besides data and program file transfers, information exchanges through LAN 150 also include messages that identify the address and declare the status of each Computing Device, etc. These are the basic conventions in the art of LAN communication. Thus, they are not detailed here.

Some of the CDs 101, 102, . . . 109 may also have been equipped with modems 111, 112, . . . 119 to access WAN 100 via signal paths 141, 142, . . . 149, through WAN links 161, 162, . . . 169, respectively. As mentioned earlier, there is a wide range of WAN technologies being used. Therefore, WAN 100 is representative of a collection of WANs. A specific modem may be needed to function with certain type of WAN. Therefore, modems 111, 112, . . . 119 are representative symbols of this class of devices. Their specific characteristics are not important to the concept of the current disclosure. That is, my invention applies to these devices, in general terms.

Modem 111 on CD 101 may be more capable than the other modems 112, . . . 119. Or, it can access a WAN with better service. It then makes sense to designate CD 101 as the Gateway, and the other CDs 102, 103, . . . 109 will be predefined as Clients which share the WAN access through the Gateway via LAN 150. Consequently, modems 112, . . . 119 in CD 102, . . . 109, respectively, are not needed under normal operation condition.

Figure 2:
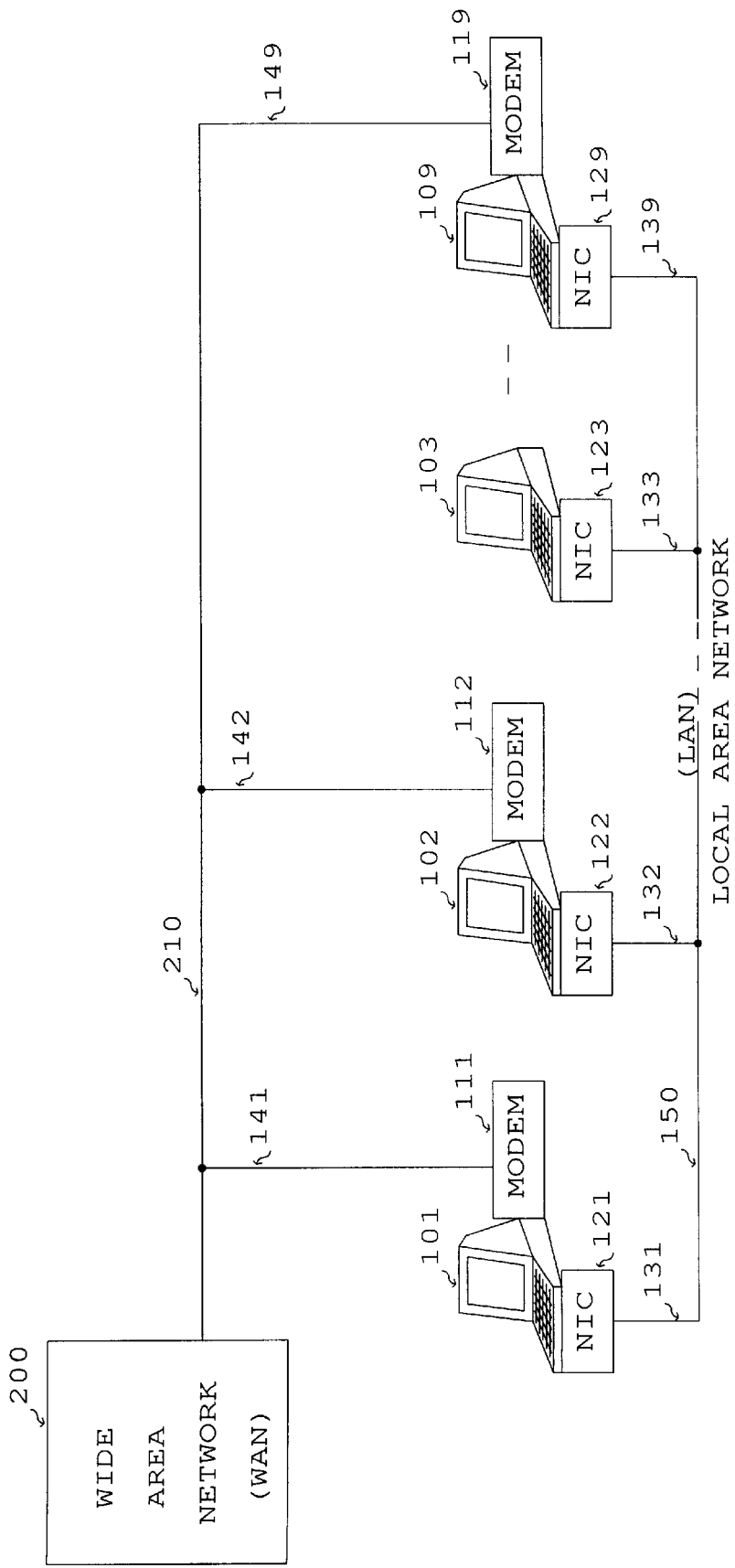
FIG. 2 is a special case of FIG. 1 where all WAN connections are through the same single physical path.

In SOHO environment, it is common to find that all modems 111, 112, . . . 119 are the same type and access the same WAN via physically the same link. For example, FIG. 2 depicts such a situation. Signal paths 141, 142, . . . 149 are all connected to the same access link 210 to WAN 200. In actual operation, only one of these modems is active at any given time. This is fine when the WAN traffic to and from each CD is low and sporadic. The most popular configuration of this kind is CDs used in residential settings where each CD is equipped with a V.90 (56K bps) modem. An individual user would utilize a modem in the respective CD to dial up to Internet for communication. Upon forming a LAN, CD 101, for example, is predefined as the Gateway to provide WAN access for the other CDs.

In either case, if the designated WAN access link is not active, either due to CD 101 not powered on, malfunctioning, LAN service disruption or the designated WAN service not available, CDs 102, . . . 109 could still have an alternate path to access WAN 100 if each is aware of the situation and capable of activating its own modem accordingly.

As an example, the basic system of my invention would start with a configuration of CD 101 predefined as the Gateway and CDs 102, 103, . . . 109 predefined as Clients.

Since CDs 102, . . . 109 are equipped with modems, they could potentially serve as temporary Gateway. Under such condition, CD 101 would join the network as a Client.

Computing Devices such as CD 103 without modem installed would always be a Client.

Once the Clients are allowed to access WAN on its own under certain conditions, the contention among multiple CDs attempting to do the same and the confusion for a CD to find a current WAN link would occur. A methodology to prevent such collisions is presented below to deploy a system with proper transitions among different operation modes.

Figure 3:
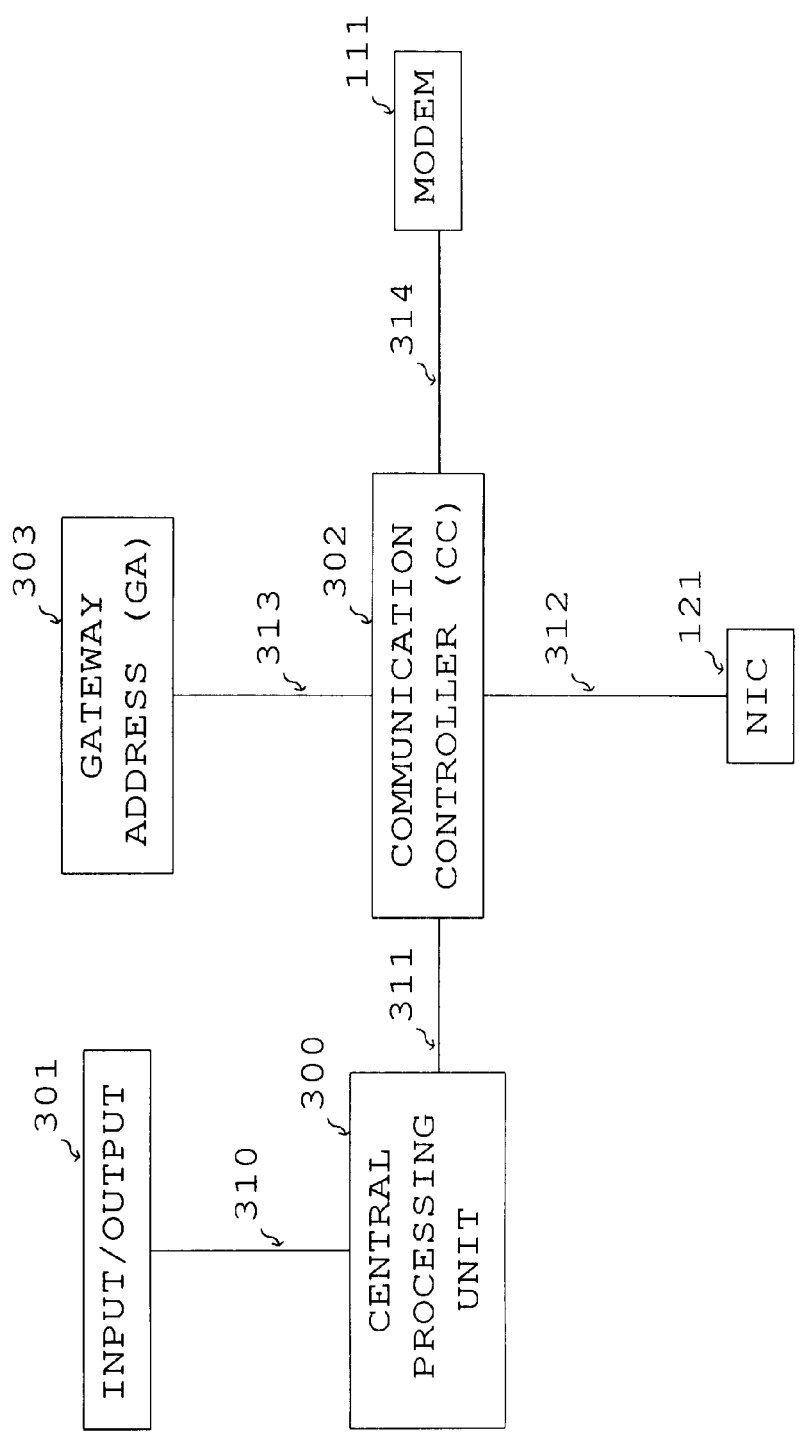
FIG. 3 is a closer view of a CD showing the essential functional subsystems.

FIG. 3 depicts the subsystems inside a Computing Device such as CD 101. Modem 111 and NIC 121 are included in this diagram for continuity & clarity. In physical implementations, these two subsystems could be either external to, or factory built within a CD, anyway.

The primary services provided by each computing device such as CD 101 are handled by Central Processing Unit (CPU) 300 and Input/Output 301 subsystems which exchange information via signal path 310. They are included here for completeness. The present invention is focused on the activities surrounding the Communication Controller (CC) 302.

When CPU 300 desires to exchange information with other computing devices, it requests CC 302 via signal path 311 to set up a link:

A. If Gateway address in GA 303 is a NIC of another computing device on LAN 150, NIC 121 is used via signal path 312.

B. If Gateway address in GA 303 is the CD's own NIC, modem 111 is used via signal path 314.

To coordinate the above communication configuration which could be changing from time to time due to the nature of CDs that may be powered on or off in an unpredictable manner under SOHO environment, each CC 302 would need to constantly update the content in its own GA 303. The following outlines the operation logic.

Figure 4:
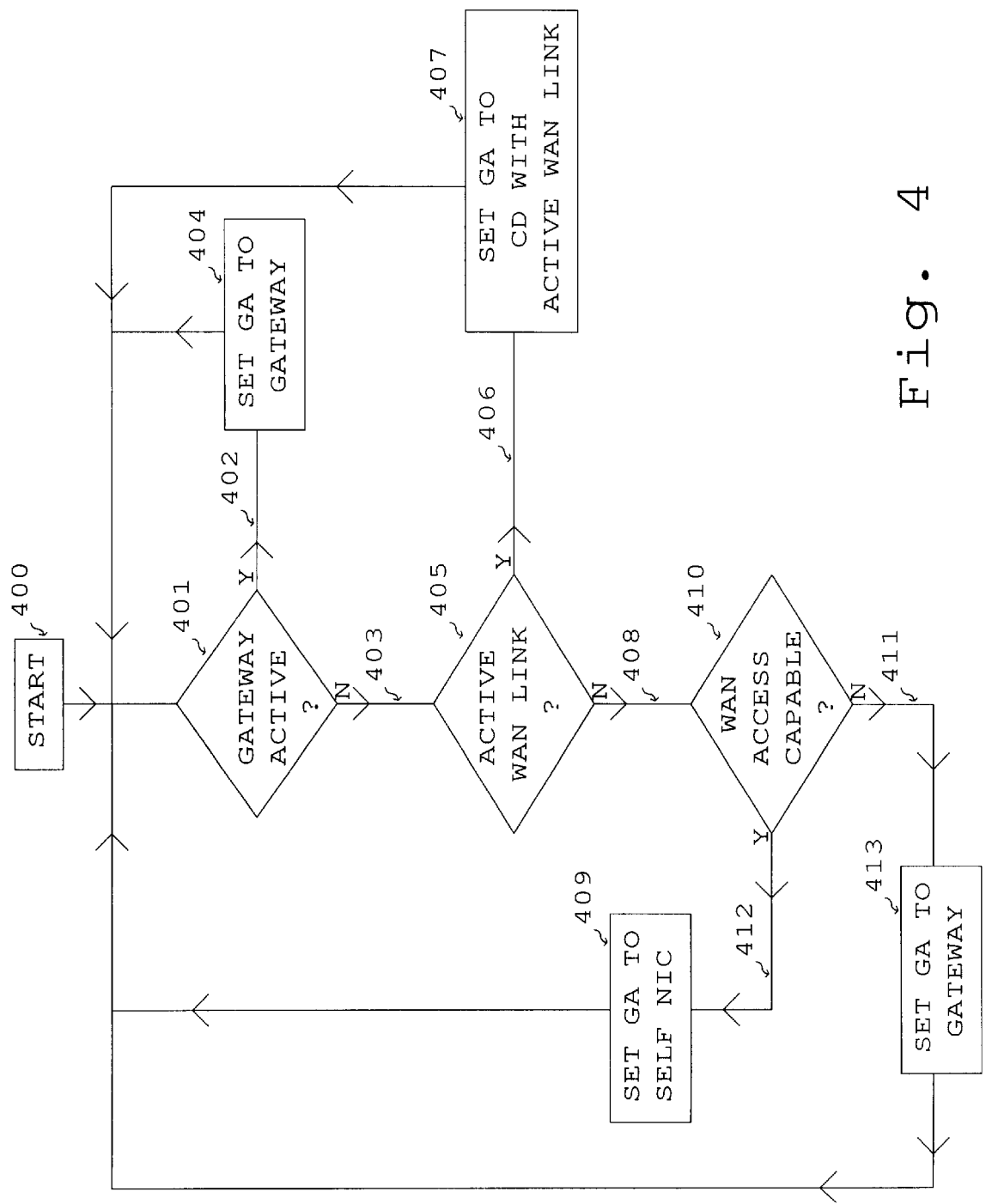
FIG. 4 is a Gateway Address update logic flow diagram for a CD that is predefined as a Client.

FIG. 4 is an operation logic of CC 302 in a CD predefined as Client. When it is initially powered on (400), GA 303 is preset with predefined Gateway's NIC address. CC 302 checks for the existence of a Gateway (401). If an active Gateway is found (402), CC 302 sets GA 303 with the NIC address of the active Gateway (404).

If an active Gateway is not found (403), CC 302 then looks for an active WAN link (405) which could be established by a CD predefined as a Client. If such a link is found (406), CC 302 would set GA 303 with the NIC address of the CD having active WAN link.

If an active WAN link does not exist (408), CC 302 checks the CD itself for WAN access capability (410). If it is equipped with a modem such that it is WAN access capable (412), then it sets GA 303 with its own NIC address (409).

If a CD is not equipped with modem for accessing WAN (411), CC 302 sets GA 303 with predefined Gateway NIC address (413).

After steps 404, 407, 409 and 413, CC 302 loops back to check for active Gateway (401), and so on again. If the situation changes, the parameters in GA 303 is updated accordingly.

Figure 5:
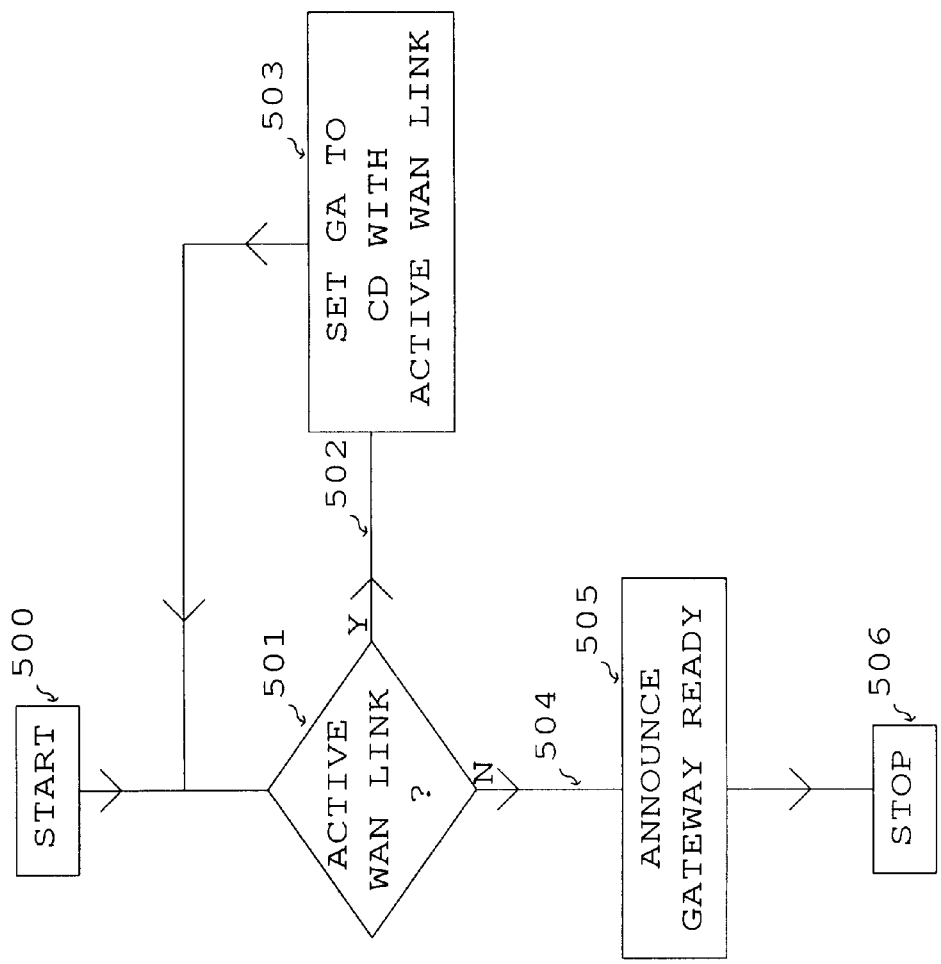
FIG. 5 is a Gateway Address update logic flow diagram for a CD that is predefined as a Gateway.

FIG. 5 is an operation logic for CC 302 of a CD that is pre-configured as a Gateway. Upon power on (500), GA 303 is preset to its own NIC address. CC 302 checks for an active WAN link that may be established by a Client (501). If it is found (502), CC 302 sets its own GA 303 to point to the NIC address of the Client with active WAN link (503).

Even after the Gateway has set itself to behave like a Client (503), it constantly checks for the status of the active WAN link (501).

If the WAN link is, or becomes inactive (504), the Gateway announces its readiness to other CDs by broadcasting through LAN 150 (505). Upon receiving such information, all other CDs will set their respective GA 303 to Gateway's NIC address (404). Consequently, the predefined WAN access configuration is established.

Once the Gateway has taken the control of the network, updating its own GA 303 is no longer needed. Therefore, Gateway's CC 302 terminates its logic (506).

When any Computing Device needs to access WAN, the current information in its Gateway Address 303 is utilized by its Communication Controller to direct the traffic. If it is pointed to itself, then use its own modem. If it is pointed to other CD, then NIC is used. The traffic from the latter case then triggers the modem in the target CD to access the WAN.

My invention outlines a procedure which can be easily implemented in the operation logic of the CDs. Consequently, a user does not need be aware of the current Gateway-Client configuration of a LAN. The user exercises the exact same procedure regardless of how the link to the WAN is connected. Appropriate setup is automatically carried out by the relevant CDs resulting in a user-friendly system.

The forgoing illustrates the principles of the invention and it will thus be appreciated that those skilled in the art will be able to devise alternative arrangements which, although not explicitly described here-in, embody the principles of the invention and are within the spirit and scope.

What is claimed is:

1. A Local Area Network (LAN) capable of automatically establishing an alternate link to Wide Area Network (WAN) when a predefined link is not available, comprising, plurality of computing devices identically designed with means to broadcast and monitor for address, identity and status information among said computing devices, means to modify own operation configuration parameters based on information received from other said computing devices, one among two or more of said computing devices further equipped with WAN access means is predefined as Gateway, remainder said computing devices with said WAN access means and additional said computing devices without said WAN access means are predefined as clients, said Gateway provides said predefined link to said WAN for all said Clients under normal operation conditions, and, any said Client with said WAN access means may provide said alternate link in absence of said Gateway.

2. A Local Area Network (LAN) in accordance with claim 1, said Clients automatically switch between said predefined link and said alternate link, depending on which one is available.

3. A Local Area Network (LAN) in accordance with claim 1, said Gateway automatically switch to behave like said Clients if said Gateway is powered on after said alternate link has been established.

4. A Local Area Network (LAN) in accordance with claim 1, said Gateway monitors for said alternate link to become inactive, and then announces its presence to take over the responsibility for providing said predefined link.

5. A Local Area Network (LAN) in accordance with claim 1, all said computing devices are reset to respective said predefined Gateway or said predefined Client status upon power down, assuring that WAN access configuration of said LAN would achieve as planned optimum performance upon application of power to said computing devices.

* * * * *